Patented June 2, 1936

2,042,830

UNITED STATES PATENT OFFICE 2,042,830

PREVENTION OF SOLUTION LOSS FROM LIQUID SYSTEMS

Henry L. Cox, Charleston, W. Va., assignor, by mesne assignments, to Union Carbide and Carbon Corporation, a corporation of New York No Drawing. Application January 6, 1931, Serial No. 507,047

4 Claims. (Cl. 252—5)

This invention relates to the prevention of losses of alcoholic solutions from liquid systems, and especially to systems wherein the liquid is circulated and subject to agitation. Throughout the specification and the appended claims the term alcohol will be understood to include all the liquid saturated aliphatic hydroxy compounds. This class of compounds is typified by the monohydroxy alcohols, such as methanol, ethanol, propanol, etc., and the poly-hydroxy alcohols, such as ethylene glycol, diethylene glycol, propylene glycol and glycerol.

An important application of the invention is in preventing the loss of alcoholic solutions from the cooling systems of internal combustion engines, and particularly the prevention of losses of ethylene glycol solutions. The invention is not limited to this application, but it will be herein described in respect thereto.

Anti-freeze solutions of water and an alcohol, such as ethylene glycol, are widely used in the cooling systems of internal combustion engines. These solutions have characteristic properties which tend to promote solution loss from liquid systems. The properties to which this invention is directed are the tendency of such solutions to loosen foreign material, iron rust or corrosion products from the metallic portions of the system, and the surface wetting quality or creepage of such solutions.

Alcoholic solutions, and particularly solutions of ethylene glycol, tend to loosen and detach from the walls of the cooling system much foreign material, such as iron rust or corrosion products, which would otherwise adhere to the metal parts of the system, and which would not be removed by water. This solid material may collect in the small passages through which the liquid circulates and partially clog the system. The result of the obstruction of such passage ways is overheating, and consequent loss of solution by vaporization.

Small openings, such as solder pores or minute crevices caused by imperfect union of metal parts are almost invariably present in cooling systems. Water will not leak through such openings, but alcohol solutions which have a greater tendency toward creepage and greater surface wetting qualities than water, will escape through these minute openings. The removal of rust and other corrosion products from the metal parts of the system by the cooling liquid tends further to facilitate the penetration of these openings by the liquid.

The object of this invention is to prevent the losses of solution induced by the above properties of alcoholic solutions in liquid systems.

In practicing the invention, it has been found that additions of an oil or an oil emulsion to the alcohol solution will minimize the solution losses. The oil or oil emulsion prevents the loosening of rust or other adhering corrosion products by alcoholic solutions and minimizes the creepage of the solution, and hence its loss through minute openings.

As one illustration of the invention, an automobile radiator which exhibited no leaks when it contained water, was filled with an anti-freeze solution containing 35% by volume of ethylene glycol. In use the radiator developed so-called "face-leaks" through a number of minute pores or cracks. A quantity of lard oil amounting to 1.5% of the volume of ethylene glycol was added to the solution. Within a short time the leaking was satisfactorily and permanently stopped. The lard oil used conformed to the following specification:

| | |
|---|---|
| Free fatty acids | 10 to 15% |
| Iodine number | 68 to 75 |
| Saponification number | 190 to 200 |
| Pour point | 35° to 45° F. |
| Specific gravity at 25° C | 0.90 to 0.92 |

As another example of the invention, the above described radiator was filled with an anti-freeze solution containing 35% by volume of ethylene glycol and an emulsion composed of lard oil, as specified in the previous example, amounting to 1.5% of the volume of ethylene glycol and triethanolamine equal to 0.5% of the volume of the ethylene glycol. In service the radiator developed no leaks, and its performance was otherwise satisfactory.

In other tests, conducted in the same manner as the preceding illustrations, a mineral oil was substituted for one-half of the lard oil, and equally beneficial results were obtained. The mineral oil had a viscosity of 100 seconds Saybolt at 100° F., and a pour point of −20° F. The mineral oil is advantageous in that it lowers the solidification point of the oil in the mixture.

Tests were also conducted in which strips of iron having a heavy adherent coating of rust were immersed in 35% ethylene glycol solutions for 300 hours at 200° F. To one solution lard oil, in an amount equal to 1.5% of the volume of ethylene glycol, was added. At the end of the tests the strips which were immersed in the untreated ethylene glycol solutions were nearly cleaned of the coating of rust which remained suspended in the liquid. The strips which were in the ethylene glycol solutions containing lard oil, however, were almost unaffected, and the solution was clear and water white at the conclusion of the test.

Other organic oils, such as sperm oil, soya bean oil, cotton seed oil or corn oil may be substituted for the preferred lard oil and other mineral oils, such as paraffin oil and liquid lubricating oils of various viscosities and congealing points may be substituted for the mineral oil of the foregoing illustration. An emulsifying agent is not essential to the invention, but better distribution of the oil results if an emulsifier is used. Hydroxy-alkylamines in quantities which produce non-corrosive solutions are preferred, but other emulsifying agents may be used.

The proportions of oil and alcohol may vary within broad limits. In general, it is necessary to use oil in an amount equal to at least 0.25% by volume of the alcohol in the solution, but up to 2.5% or 3.0% may be used without detracting from the value of the invention.

I claim:

1. A composition of matter adapted to be mixed with water to form an anti-freeze cooling medium of low wetting power on metals, said composition comprising from about 0.5% to about 3.0% by volume of a mixture of lard oil and mineral oil, together with a minor quantity of a hydroxy-alkylamine, the balance being principally ethylene glycol.

2. A composition of matter adapted to be mixed with water to form an anti-freeze cooling medium of low wetting power on metals, said composition comprising from about 0.5% to about 3.0% by volume of a mixture of lard oil and mineral oil, the lard oil constituting at least about 0.25% by volume of the composition, and the balance being principally ethylene glycol.

3. A composition of matter adapted to be mixed with water to form an anti-freeze cooling medium of low wetting power on metals, said composition comprising about 1.5% by volume of lard oil and about 0.75% by volume of triethanolamine, the balance being principally ethylene glycol.

4. A composition of matter adapted to be mixed with water to form an anti-freeze cooling medium of low wetting power on metals, said composition comprising from about 0.5% to about 3.0% by volume of a mixture of lard oil and mineral oil, the lard oil constituting at least about 0.25% of the volume of the composition, and about 0.75% by volume of triethanolamine, the balance being principally ethylene glycol.

HENRY L. COX.

CERTIFICATE OF CORRECTION.

Patent No. 2,042,830.  June 2, 1936.

HENRY L. COX.

It is hereby certified that error appears in the printed specification of the above numbered patent requiring correction as follows: Page 1, second column, line 27, in the table, for "0.90" read 0.91; and that the said Letters Patent should be read with this correction therein that the same may conform to the record of the case in the Patent Office.

Signed and sealed this 11th day of August, A. D. 1936.

(Seal)

Henry Van Arsdale
Acting Commissioner of Patents.